United States Patent [19]
Markovitz et al.

[11] Patent Number: 5,631,718
[45] Date of Patent: May 20, 1997

[54] TEMPLE FOR EYEWEAR

[75] Inventors: Aaron M. Markovitz; Henri Brune; Jeffrey K. Raub, all of Rochester, N.Y.

[73] Assignee: Bausch & Lomb Incorporated, Rochester, N.Y.

[21] Appl. No.: 668,392

[22] Filed: Jun. 25, 1996

Related U.S. Application Data

[63] Continuation of Ser. No. 382,237, Feb. 1, 1995, abandoned.
[51] Int. Cl.⁶ .................................................. G02C 5/14
[52] U.S. Cl. ........................ 351/119; 351/111; 351/123
[58] Field of Search ............................. 351/119, 118, 351/121, 123, 122, 111, 113, 41; 2/426, 448

[56] References Cited

U.S. PATENT DOCUMENTS

| 4,204,749 | 5/1980 | Davis | 351/123 |
| 4,684,226 | 8/1987 | Anger | 351/123 |
| 4,848,891 | 7/1989 | Lee | 351/113 |
| 5,054,903 | 10/1991 | Jannard et al. | 351/123 |

FOREIGN PATENT DOCUMENTS

| 567255 | 6/1923 | France. | |
| 4121691A | 1/1992 | Germany | 351/111 |

Primary Examiner—Hung X. Dang
Attorney, Agent, or Firm—Katherine McGuire; John E. Thomas

[57] ABSTRACT

Temples for eyewear include a first portion for contacting the head of the wearer and a second portion for connecting the first temple portion to the eyewear front. The first temple portion is movable to accommodate a wide variety of head shapes or sizes and provide a more secure fit.

13 Claims, 7 Drawing Sheets

TEMPLE FOR EYEWEAR

This is a continuation of application Ser. No. 08/382,237 filed on Feb. 1, 1995 now abandoned.

BACKGROUND OF THE INVENTION

The present invention relates to eyewear having temple portions that provide improved and more secure fit independent of head shape or size.

Generally, eyewear, such as spectacles and sunglasses, is composed of a front and two temples (or earstems) extending rearwardly from the front for securing the eyewear on the head of a wearer. Commonly, the temples are one-piece temples connected to the eyewear front by hinges. A drawback of such conventional eyewear is that when a wearer engages in physical activity such as active sports, the eyewear may not fit sufficiently securely on a wearer's head. A further drawback is that these conventional temples may not fit satisfactorily a wide variety of head shapes or sizes.

Several approaches have been proposed to make eyewear with temples fit more securely.

As a first example, the temples may include earpieces at the ends of the temples that wrap around the ear of a wearer. As a further example, the hinges connecting the front and temples of the aforementioned eyewear may have a spring action to bias the temples toward the head of the wearer.

More complicated temple designs have been proposed wherein eyewear includes adjustable temples, such that a wearer can manually adjust the degree of bias of the temples against the head, for example, U.S. Pat. Nos. 4,204,749 and 4,848,891. Additionally, it has been proposed to secure eyewear better by including frictionally engaging members on a portion of the temples, for example, U.S. Pat. Nos. 4,204,749 and 5,054,903.

While the aforementioned approaches address better securing the eyewear to the head, a drawback of the above approaches is that a relatively small area of the temple contacts the head when the eyewear is worn. Similar to the aforementioned conventional temples, the temples have no or minimal contact with the side of the head forward of the wearer's ears. Additionally, the temples may not fit satisfactorily a wide variety of head shapes or sizes.

SUMMARY OF THE INVENTION

The invention relates to eyewear, such as spectacles and sunglasses, comprising a front and two temples extending rearwardly from opposed ends of the front. The front includes at least one lens, such as a unitary lens or two separate lenses joined to a frame.

Each temple comprises a first temple portion for contacting the head of a wearer, and a second temple portion for interconnecting the first temple portion and the front. The second temple portion includes a posterior end and an anterior end, wherein the anterior end is connected to the eyewear front and the posterior end is connected to the first temple portion. Generally, the first temple portion will not be connected directly to the eyewear front, but will be connected to the front only through the second temple portion.

The first temple portion is movable with respect to the second temple portion, such that when the eyewear is placed on the head of a wearer, the first temple section adjustably moves to conform to the shape or size of the wearer's head. This adjustable movement is accomplished without the need for a wearer to manually adjust the temples. Accordingly, the eyewear fits satisfactorily a wider variety of head shapes or sizes.

According to several embodiments, the posterior end of the second temple portion is connected to a central section of the first temple portion, the central section being between posterior and anterior ends thereof, in order to facilitate the first temple portion better conforming to the head of the wearer, According to various preferred embodiments, the second temple portion includes a flexible section that can flex for adjustably moving the first temple portion, or the first and second temple portions are pivotably connected with a hinge.

DETAILED DESCRIPTION OF PREFERRED EMBODIMENTS

Figure 1:
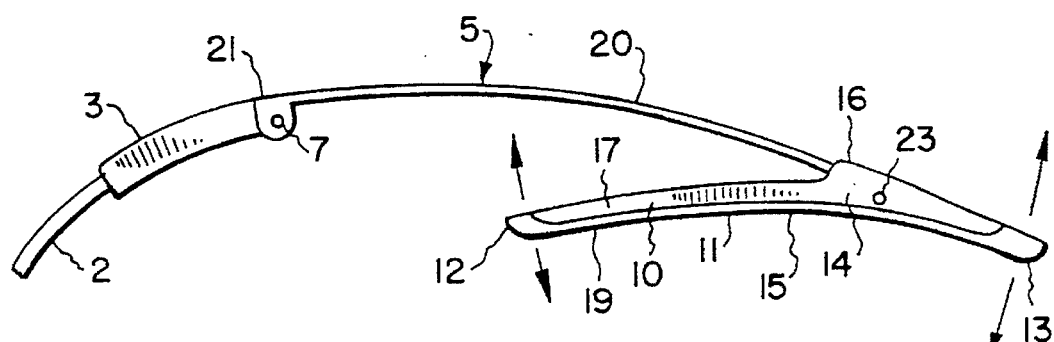
FIG. 1 is a top view of a right temple according to first embodiment of the invention, including a fragmented view of the eyewear front.
Figure 2:
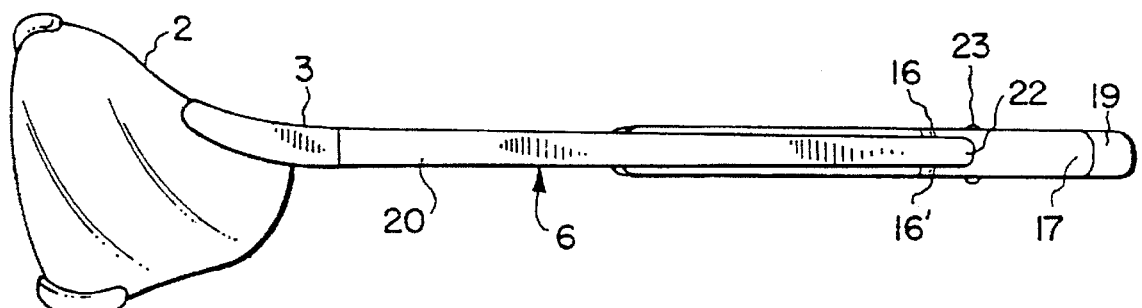
FIG. 2 is an outer, side view of a left temple according to the embodiment shown in FIG. 1.
Figure 3:
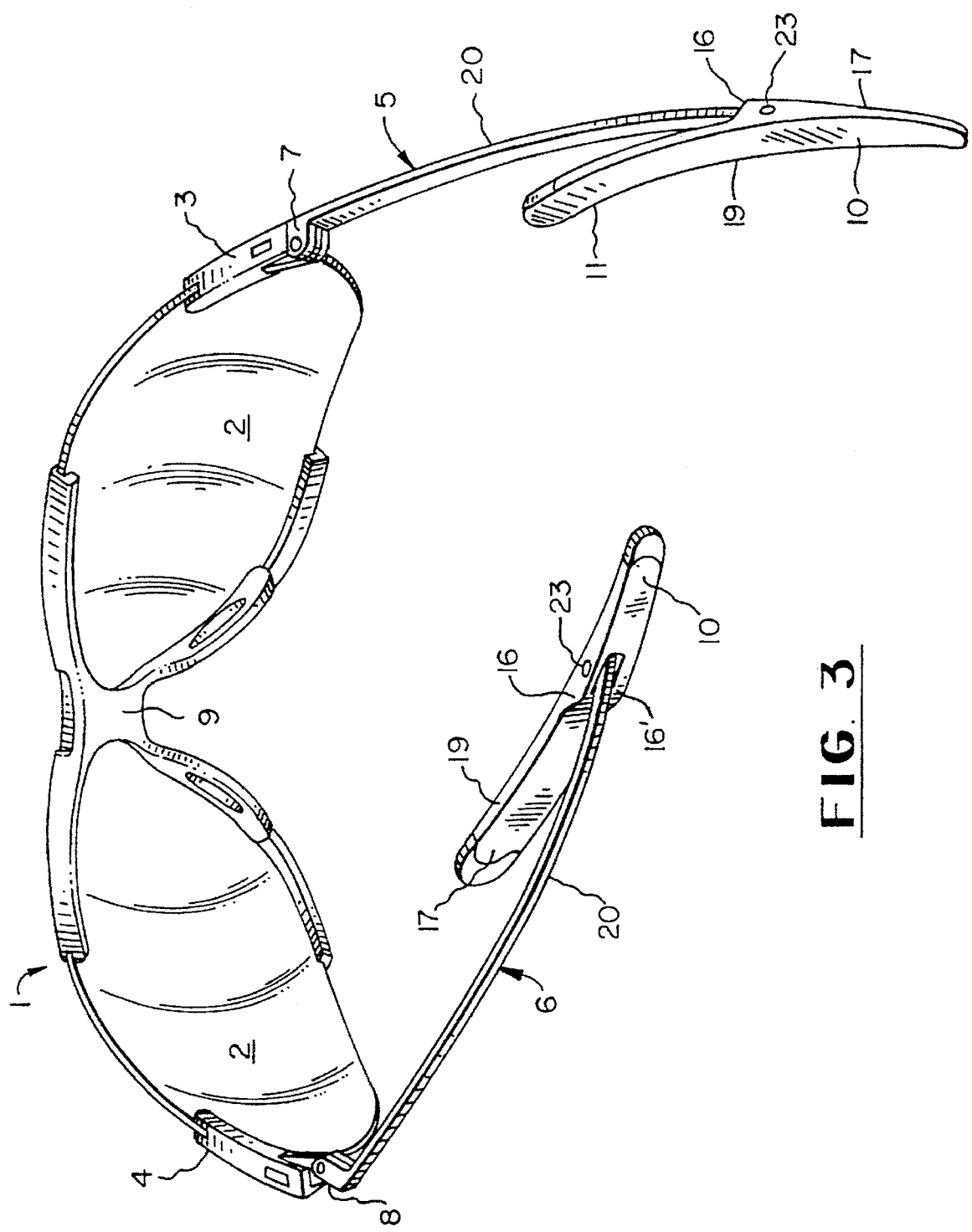
FIG. 3 is a top, rear perspective view of eyewear including the temples of FIGS. 1 and 2.

FIGS. 1 to 3 represent a first preferred embodiment of the invention.

As shown in FIG. 3, the eyewear comprises an eyewear from 1, composed mainly of a unitary lens 2, a nosepiece 9, and plastic end pieces 3, 4 at opposed ends. Temples 5, 6 extend rearwardly from front 1, and for the illustrated embodiment, temples 5, 6 are connected to end pieces 3, 4 of front 1 via hinges 7, 8, respectively. Hinges 7, 8 allow for folding temples 5, 6 for compactly storing the eyewear when not in use. It will be appreciated, however, that the invention is applicable to eyewear having a variety of configurations. For example, the eyewear front may be composed of a frame with two separate lenses wherein the temples are connected in a conventional manner to opposite ends of the frame. Alternately, temples 5, 6 may be connected directly in a conventional manner to a unitary lens instead of being connected to end pieces 3, 4. Other configurations of eyewear having a from and two temples will be evident to one skilled in the art.

FIGS. 1 and 2 illustrate right temple 5 and left temple 6, respectively, in more detail. The right and left temples are mirror images, and for sake of brevity, it is understood that any detailed discussion of right temple 5 will relate to left temple 6 and vice versa.

Referring still to FIGS. 1 and 2, temple 5 is seen to comprise a first temple portion 10 and second temple portion 20. Interior surface 11 of first temple portion 10 contacts the side of a head of a wearer when the eyewear is worn. Preferably, interior surface 11 provides an elongated, arcuate surface for contacting the wearer's head. It is also preferred that first temple portion 10 has a length, measured between anterior end 12 and posterior end 13, of at least two inches (5.1 cm), and more preferably at least three inches (7.6 cm), to provide a relatively large surface area for contacting the wearer's head. (for a first temple portion having an arcuate shape, the length is referred to as "arcuate length" which is represented by the length of the arc forming interior surface 11 between ends 12, 13.)

Second temple portion 20 interconnects first temple portion 10 and end piece 3 of eyewear front 1. More specifically, for the illustrated embodiment, anterior end 21 is connected to end piece 3 of front 1 via hinge 7, and posterior end 22 is pivotally connected to first temple portion 10 as described more fully below.

Second temple portion 20 may be essentially straight or have an arcuate shape as illustrated. The length of temple portion 20 will vary depending on the type of eyewear front to which it is mounted. For example, if the eyewear front has a relatively large wrap depth (i.e., the front extends considerably around the side of the head of the wearer), temple portion 20 may have a relatively short length. Conversely, if the eyewear front has a relatively small wrap depth (i.e., the front does not extend far around the side of the head), temple portion 20 may have a relatively longer length. Generally, however, second temple portion 20 will have a length in the range of about 3 inches to about 5 inches (about 7.6 to about 12.7 cm).

In the embodiment of FIGS. 1 to 3, first and second temple portions 10, 20 are pivotally connected with a hinge, the hinge including pin 23 and connecting posterior end 22 of second temple portion 20 to a central section 14 of first temple portion 10. This hinge connection provides a pivot point, such that first temple portion 10 may pivot about this pivot point; more specifically, both anterior and posterior ends 12, 13 are movable as shown by the arrows in FIG. 1.

Figure 4:
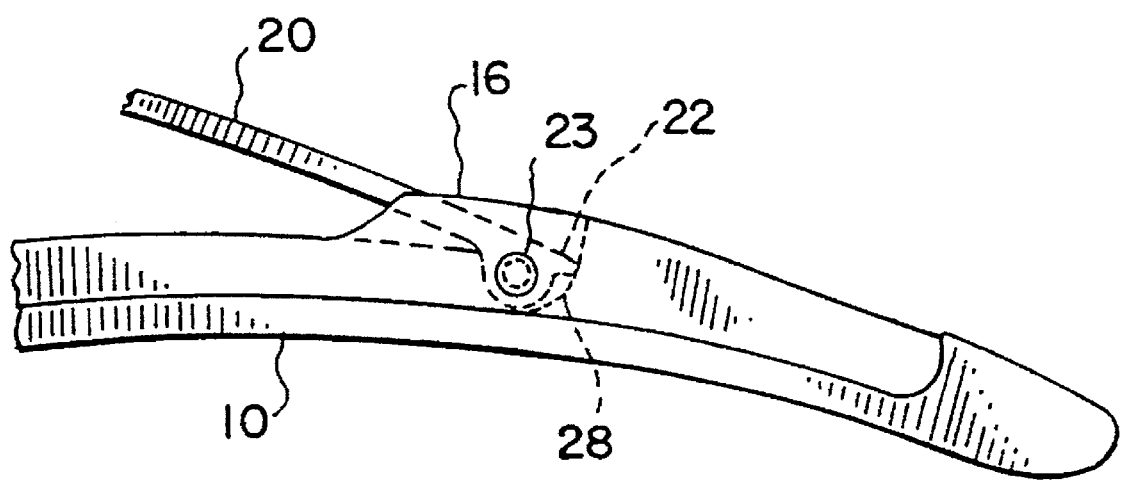
FIG. 4 is an enlarged, fragmented top view of the temple shown in FIG. 1.
Figure 5:
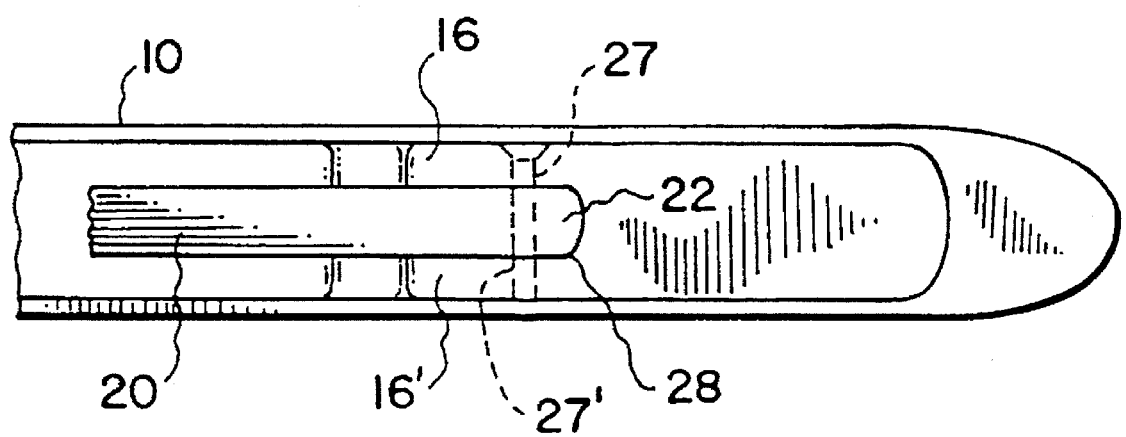
FIG. 5 is an enlarged, fragmented side view of the first temple portion shown in FIG. 2.

More specifically, with reference to FIGS. 4 and 5, pin 23 forms a hinge connection with a bore in the posterior end 22 of second temple portion 20 and a pair of bores 27, 27' in central section 14 of first temple portion 10. First temple portion 10 further includes a top extension 16 and a bottom extension 16' between which posterior end 22 of temple portion 20 is aligned. Temple portion 10 further includes a recessed area 28, in the surface between extensions 16, 16', for receiving posterior end 22 of temple portion 20. This structure ensures that a longitudinal axis of portion 20 remains substantially aligned with a longitudinal axis of portion 10, thus avoiding undue stress on the hinge connection when the eyewear is handled.

Preferably, second temple portion 20 has sufficient rigidity to bias first temple portion 10 towards the wearer's head. For the embodiment shown in FIG. 1, this temple portion 20 may be constructed of a metal, such as a spring metal, to provide the desired bias. Accordingly, when the eyewear is placed on the head of a wearer, first temple portion 10 adjustably moves, by pivoting about hinge connection 23, to conform to the head of a wearer.

As mentioned, the length of second portion 20 may vary according to the specific eyewear front. It is preferred, however, that the length of second temple portion 20 is selected so that hinge connection at pin 23 is located near, or just behind, the ear of a wearer of the eyewear. It is also preferred that the hinge connection at pin 23 is located rearward of a centerpoint 15 of first temple portion 10. This ensures that interior surface 11 contacts the side of a wearer's head both forward and rearward of the ears.

First temple portion 10 may be constructed of a wide variety of materials, or a combination of materials. As shown in FIGS. 1 and 2, interior piece 19 of temple portion 10 (i.e., the piece that includes the interior surface 11 that contacts the wearer's head) and the opposite exterior piece 17 (i.e., the piece that is attached to the second temple portion 20) may be formed of different materials. For example, interior piece 19 may be formed of a relatively soft plastic or a rubbery material (such as polypropylene or a thermoplastic elastomer), to promote comfort or increase frictional engagement between contacting surface 11 and the wearer's head. Exterior piece 17, on the other hand, may be formed of a more rigid plastic (such as polypropylene or a thermoplastic elastomer, having more rigidity than that used for interior piece 19). Interior piece 19 and exterior piece 17 may be co-molded to bond these elements together, or the elements may be bonded with an adhesive or fastened with a mechanical fastener.

Figure 6:
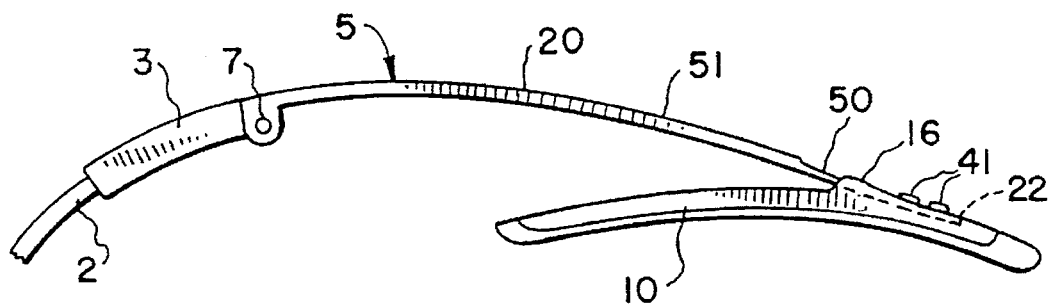
FIG. 6 is a top view of a right temple according to a second embodiment of the invention.
Figure 7:
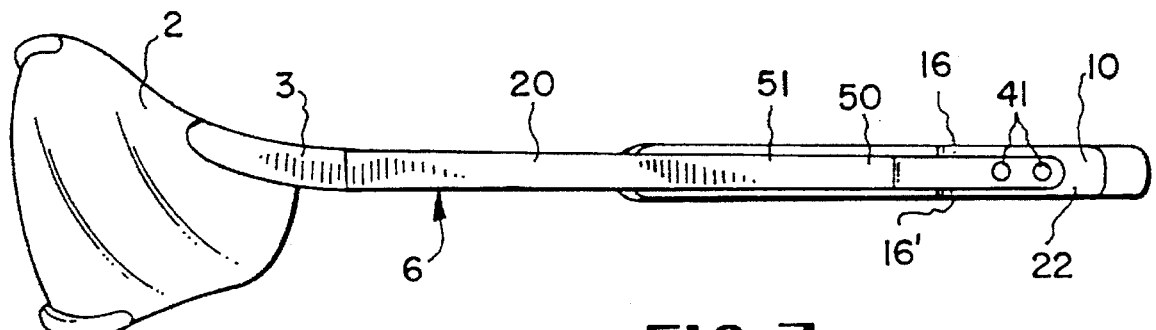
FIG. 7 is an outer, side view of a left temple according to the embodiment shown in FIG. 6.

An alternate embodiment is represented in FIGS. 6 and 7, where like reference numerals represent the same elements as in FIGS. 1 to 3. For this alternate embodiment, the posterior end 22 of second temple portion 20 is secured to first temple portion 10, between extensions 16, 16', with rivets 41 (or like fasteners, such as screws) instead of a hinge connection. Second temple portion 20 includes a thinner, flexible section 50, near its posterior end 22. For the illustrated embodiment of FIGS. 6 and 7, second temple portion 20 may be constructed of a spring metal, with flexible section 50 being thinned with respect to the adjacent anterior section 51 of temple portion 20. Accordingly, when the eyewear is placed on the head of a wearer, thinner section 50 will flex whereby first temple portion 10 adjustably moves by pivoting about a flexing point on section 50 to conform to the head of a wearer. (As used herein, the term "pivot" or like terms encompasses the various adjustable movements of first temple portion 10, such as movements attributed to flexing of flexible section 50.)

Figure 8:
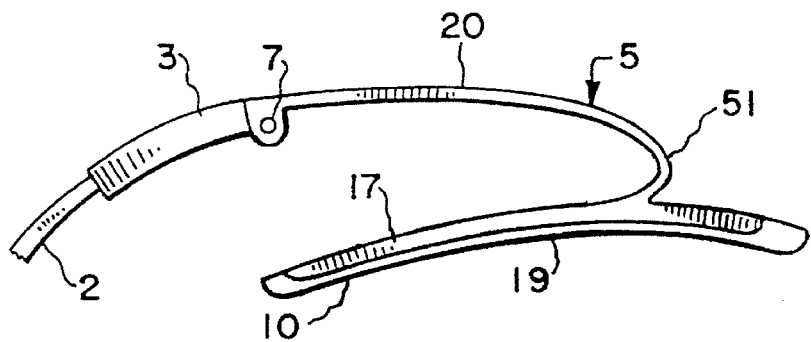
FIGS. 8 to 11 are top views of right temples according to additional embodiments of the invention.

FIG. 8 illustrates another embodiment where second temple member 20 includes a sharply curved flexible section 51. For this embodiment, the sharply curved flexible section 51 tends to bias first temple portion 10 against the wearer's head, whereby first temple portion 10 is able to adjustably move to conform to the wearer's head by pivoting about a pivot point on flexible section 51. Second temple portion 20 may be constructed of metal or a durable yet resilient plastic such as polypropylene or polyethylene. As illustrated, portion 20 may be integrally molded from a plastic with exterior piece 17 of first temple portion 10.

Figure 9:
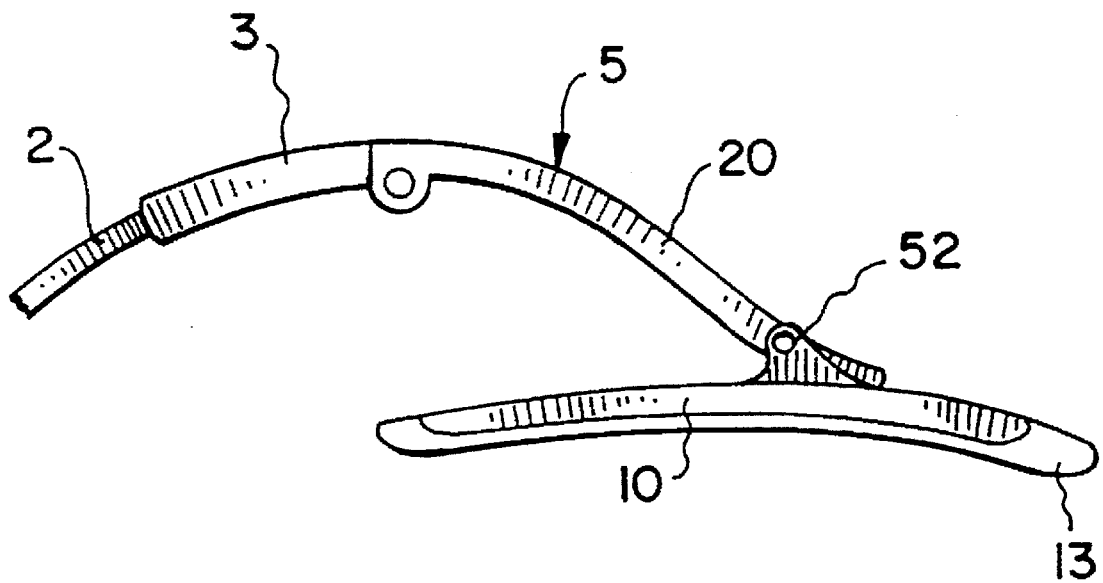

FIG. 9 illustrates another alternate embodiment of temples 5, 6. Similar to the embodiment shown in FIGS. 1 to 3, first temple portion 10 and second portion 20 are pivotally connected via a hinge connection, designated 52. However, hinge 52 is a spring action hinge, that biases end 13 towards the head of a wearer. Whereas for the embodiment of FIGS. 1 to 3 the second temple portion 20 preferably had an arcuate shaped and was constructed of a spring metal, so that first temple portion was biased towards a wearer's head by virtue of the resiliency and shape of portion 20, for the embodiment of FIG. 9 such biasing is provided by the spring action of hinge 52. Second temple portion 20 may be constructed of a material other than spring metal, e.g., a plastic such as polypropylene or polyethylene.

Figure 10:
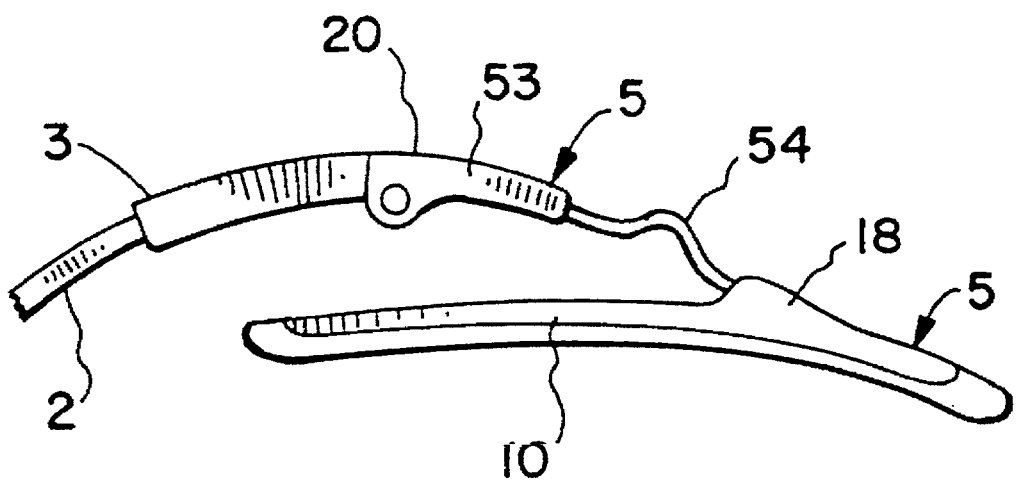
Figure 11:
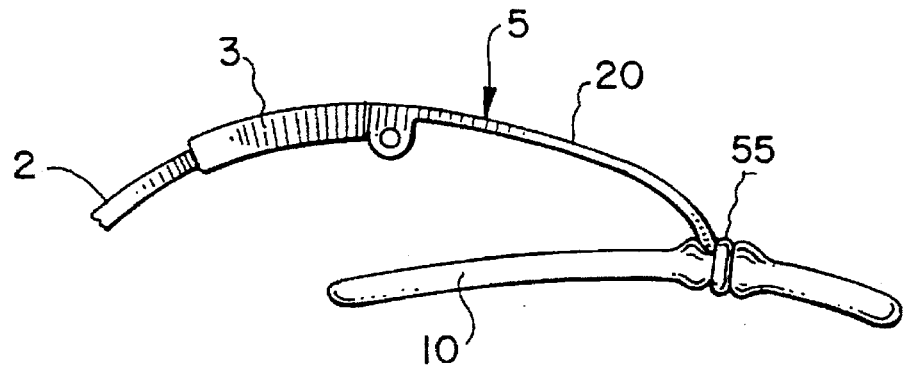

FIG. 10 illustrates yet another embodiment where second temple portion 20 includes a curvilinear flexible section 54. Flexible section 54 may be constructed of a metal, and for the illustrated embodiment, an anterior end of section 54 may be molded-in plastic piece 53, piece 53 forming the anterior end of second temple portion 20, and a posterior end of section 54 may be molded-in extension 18 of first temple portion 10. Section 54 is considerably thinner than the remainder of the second temple portion, and the curvilinear shape and resilient construction of section 54 tends to bias first temple portion 10 against the wearer's head, whereby first temple portion 10 is able to adjustably move to conform to the wearer's head by pivoting (or flexing) about a pivot point on curvinear flexible section For the embodiment shown in FIG. 11, second temple portion 20 is constructed of a metal and its posterior end has an O-ring configuration 55 attached to first temple portion 10. When the eyewear is placed on the head of a wearer, the first temple portion 10 adjustably moves by pivoting about O-ring 55. For this embodiment, portion 10 may be constructed of a foam-like material coveting a metal or plastic core. Due to the resiliency and texture of the foam-like material, portion 10 fits comfortably against, and frictionally engages, the head of a wearer.

Figure 12:
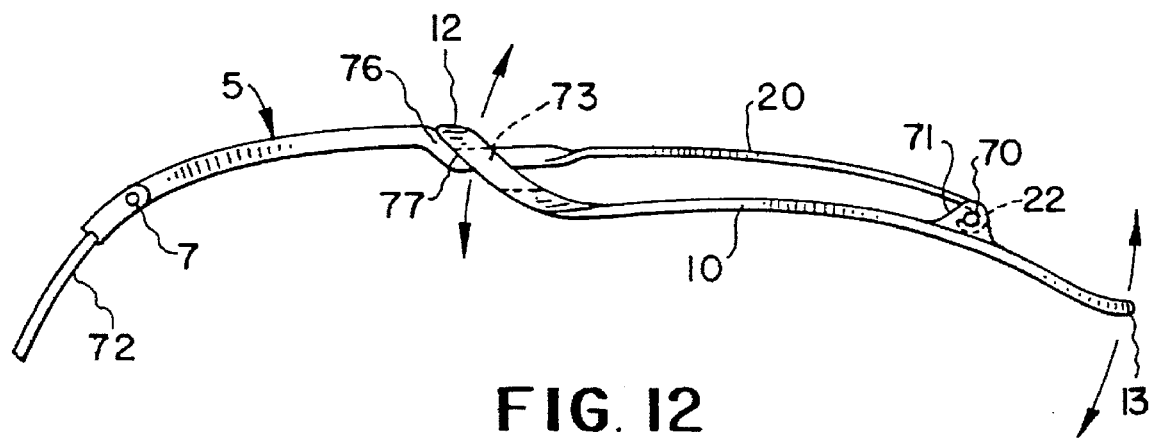
FIG. 12 is a top view of a right temple according to a further embodiment of the invention.
Figure 13:
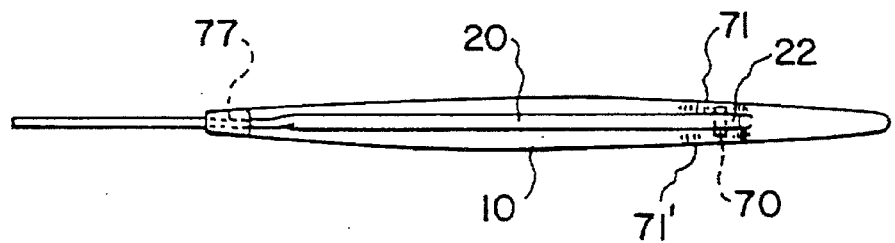
FIG. 13 is a side view of the temple shown in FIG. 12.

FIGS. 12 and 13 illustrate another embodiment where posterior end 22 of second temple portion 20, coiled around pin 70, forms a spring action connection. The anterior end 21 of second temple portion is connected to a top frame 72 of the eyewear from. Second temple portion 20 is preferably constructed of a metal, and first temple portion 10 may be constructed of a plastic. As shown, pin 70 extends between two extensions 71, 71' of first temple portion 10. The anterior end 12 of first temple portion 10 is curved outwardly (i.e., away from the head of a wearer) and has a slotted aperture 73 through which a central section of second temple portion 20 extends. (In assembling temple 5 for this embodiment, second temple portion 20 is first inserted through aperture 73, and then posterior end 22 is attached to pin 70.)

Accordingly, first temple portion 10 may pivot about the hinge connection at pin 70, such that both anterior and posterior ends 12, 13 are movable as shown by the arrows in FIG. 12. However, aperture 73 defines the maximum positions that first temple portion 10 may pivot. More specifically, when the eyewear is not in use, the spring at pin 70 biases first temple portion 10 such that temple 5 assumes the position shown in FIG. 12, with aperture 77 defining the maximum movement at this position. And if desired, second temple portion 20 may include a bend 76, providing a complementary surface against which surface 77 of anterior end 12 may abut at this position, as shown in FIG. 12. When the eyewear is placed on the head of a wearer, the first temple section 10 adjustably moves to conform to the shape or size of the wearer's head.

Figure 14:
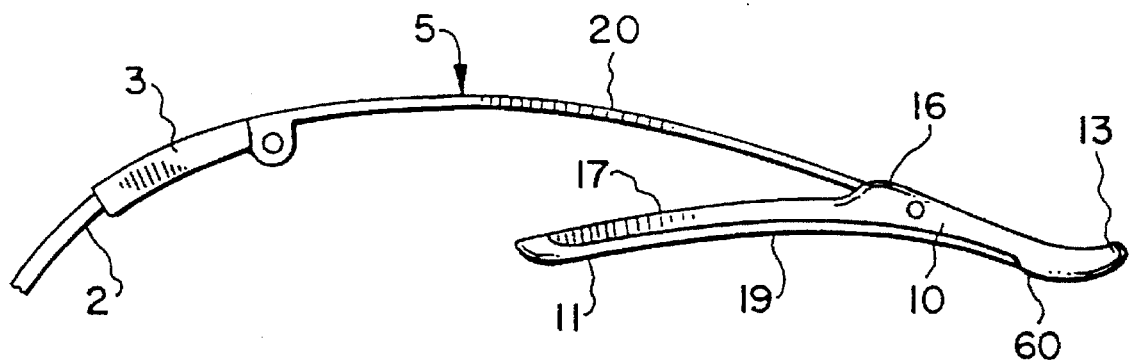
FIG. 14 is a top view of an additional embodiment of the invention.

FIG. 14 illustrates a feature according to a further embodiment of the invention. Posterior end 13 is curved outwardly from the head of a wearer, such that interior surface 11 (which contacts the head of a wearer when the eyewear is worn) terminates at point 60. In some cases, and especially where interior piece 11 is made of a material that frictionally engages the head, the curved shape of end 13 may inhibit any tendency of end 13 to grip wearer's hair when the eyewear is placed on, or removed from, a wearer's head.

Although only a few embodiments of the present invention have been specifically described above, it should be appreciated that many additions and modifications can be made without departing from the spirit and scope of this invention. Further, it is understood that the subject invention is not limited by the example or embodiments set forth above, but shall include modifications and variations that fall within the scope of the attached claims.

What is claimed is:

1. Eyewear comprising:
    a front and two temples extending rearwardly from opposed ends of said front, wherein each temple comprises:
        a first temple portion for contacting the head of a wearer, said first temple portion having anterior and posterior ends and a centerpoint lying midway said anterior and posterior ends of said first temple portion, and
        a second temple portion for interconnecting said first temple portion and said front, said second temple portion including a posterior end and an anterior end, said second temple portion anterior end being pivotally connected to said eyewear front and movable with respect thereto about a first pivot axis, and said second temple portion posterior end being pivotally connected to said first temple portion at a location between said first temple portion centerpoint and said first temple portion posterior end,
    said first temple portion being movable with respect to said second temple portion at the point of connection of said posterior end of said second temple portion to said first temple portion about a second pivot axis which extends parallel to said first pivot axis.

2. The eyewear of claim 1, wherein said first temple portion includes opposite exterior and interior surfaces, said interior surface contacting the head of the wearer when the eyewear is worn by the wearer, said posterior end of said second temple portion connected to said exterior surface of said first temple portion.

3. The eyewear of claim 1, wherein said first temple portion is connected to said second temple portion with a hinge.

4. The eyewear of claim 3, wherein said first temple portion is connected to said second temple portion with a spring action hinge.

5. The eyewear of claim 1, wherein the second temple portion includes a flexible section adjacent said second temple portion posterior end and said first temple portion is pivotal about said flexible section.

6. The eyewear of claim 5, wherein the flexible section is constructed of metal and has increased flexibility than the remainder of said second temple portion.

7. The eyewear of claim 1, wherein said pivotal connection is located rearwardly adjacent the ear of a wearer when the eyewear is placed on the wearer's head.

8. The eyewear of claim 1, wherein said first temple portion has an elongated arcuate shape extending along a single plane which lies substantially normal to the axis about which said first temple portion moves relative to said second temple portion, said first temple portion including an arcuate interior surface for contacting the head of a wearer.

9. The eyewear of claim 8, wherein said first temple portion has an arcuate length of at least 2 inches.

10. The eyewear of claim 8, wherein said second temple portion has an elongated arcuate shape extending along said single plane.

11. The eyewear of claim 10, wherein the radius of curvature of said first and second temple portions are substantially the same such that said first and second temple portions lie along substantially the same arc when said anterior end of said first temple portion is moved against said second temple portion.

12. The eyewear of claim 1, wherein said anterior end of said first temple portion includes a slotted aperture through which a central section of said second temple portion freely extends.

13. The eyewear of claim 12, wherein said slotted aperture defines maximum pivotal movements of said first temple portion with respect to said second temple portion.

* * * * *